US006799237B2

(12) United States Patent
Krancher et al.

(10) Patent No.: US 6,799,237 B2
(45) Date of Patent: Sep. 28, 2004

(54) IDENTIFYING AND SYNCHRONIZING INCOMPATIBILITIES BETWEEN A PORTABLE COMPUTER AND A DOCKING STATION

(75) Inventors: Robert E. Krancher, Houston, TX (US); Scott P. Saunders, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 483 days.

(21) Appl. No.: 09/870,258

(22) Filed: May 30, 2001

(65) Prior Publication Data

US 2002/0184297 A1 Dec. 5, 2002

(51) Int. Cl.$^7$ .............................................. G06F 13/00
(52) U.S. Cl. ...................... 710/300; 710/303; 710/304; 710/104
(58) Field of Search .............................. 710/2, 72, 106, 710/104, 105, 300, 303, 304; 361/686; 713/340

(56) References Cited

U.S. PATENT DOCUMENTS

| 5,463,742 A | * | 10/1995 | Kobayashi | 710/303 |
| 5,596,728 A | * | 1/1997 | Belmont | 710/304 |
| 5,642,517 A | * | 6/1997 | Shirota | 713/340 |
| 6,088,752 A | * | 7/2000 | Ahern | 710/303 |
| 6,154,798 A | * | 11/2000 | Lin et al. | 710/72 |

* cited by examiner

Primary Examiner—Khanh Dang

(57) ABSTRACT

The present invention comprises a system and method for insuring that a notebook computer and a docking station are compatible. This determination is made by each of the notebook and docking station communicating via a serial communication pathway. Each of these devices reads a product code and a ROM date associated with the other device, and then independently determine whether the other device may be safely communicated with or "docked." The systems and methods also take into account that two devices may be docked, but that only minimum functionality can exist between them based on differences in software revisions. In this case, the systems and methods allow the two devices to dock, but the computer system user is notified of the differences in software revisions.

34 Claims, 4 Drawing Sheets

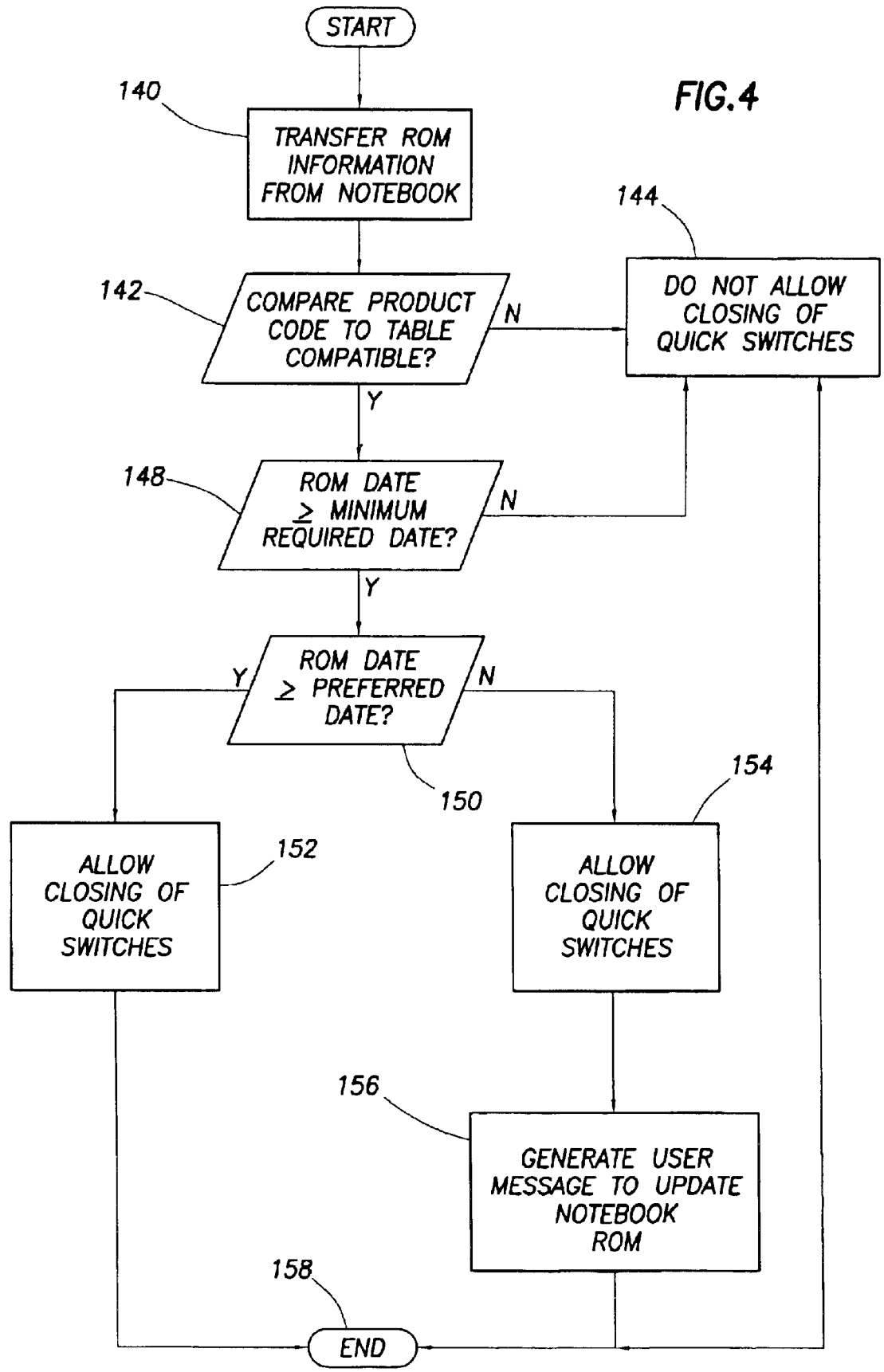

IDENTIFYING AND SYNCHRONIZING INCOMPATIBILITIES BETWEEN A PORTABLE COMPUTER AND A DOCKING STATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to notebook computers and related docking stations. More particularly, the present invention relates to detecting the compatibility of a notebook and a docking station, and in the proper circumstances notifying the computer user of upgrades necessary or required to increase functionality of the coupled units.

2. Background of the Invention

Notebook computers have become very popular in recent years because of their portable functionality. In not being constrained to a desk or other particular location, a notebook computer user has the capability of utilizing almost the complete functionality of a computer at locations that are not generally conducive to the use of a desktop-type computer.

However, with the portability feature also comes a relatively small size. In fact, some notebook computers of the present day have profiles of less than one inch and footprints only slightly larger than the standard piece of paper. Because of this small size, some functionality is lost, as compared to a desktop computer. To combat the loss of functionality, computer manufacturers provide some form of docking station for most notebooks.

Docking stations can take many forms. Some docking stations may be mere port replication devices. That is, there is no added functionality to the docking station; but rather, this lowest level docking station merely makes it easier to physically couple external devices such as scanners, full-size keyboards, printers, and the like.

A second level of docking station may perform these port replication functions, but also include hardware sufficient to extend one of the primary or secondary expansion buses of the notebook computer. By extending one of the communication buses of the notebook, functionality may be added to the computer that is not otherwise available to a notebook user because of the size of the notebook. For example, a user may add a second hard drive, a CD read/write device, a network interface card, or some other such device that is generally not available in the notebook standing alone. However, most expansion buses limit the number of devices that may be coupled to them, either for reasons of the particular protocol or for physical limitations on the bus itself. Thus, in the second level of docking station that merely extends an expansion bus of the notebook, the functionality that may be added is limited.

To combat the problems associated with merely extending one of the expansion buses of the notebook computer, some computer manufacturers place a bus bridge circuit within the docking station. In this way, the physical or protocol driven constraints as to the number of devices coupled to the bus can be increased significantly. As the technology of the docking station increases, it becomes important to ensure that the notebook computer is itself compatible with the hardware present in the docking station.

It is also common across families of notebook computers that each of the notebooks in the family may be capable of docking with multiple docking stations. In other words, it is not necessary that the notebook computer dock only with one particular docking station. Some computer manufacturers also support docking newer models of notebook computers with older docking stations. While these capabilities create many options for the computer system user, they also create problems for computer manufacturers with regard to ensuring that a particular notebook can dock with a particular docking station without damaging either of those devices. The problem is exacerbated in that in some cases a notebook may dock with a particular docking station, but with limited functionality, possibly because that docking station or the notebook needs software updates.

What is needed in the art is an inexpensive and reliable mechanism to insure that each notebook and docking station are compatible before allowing a complete electrical docking. What is further needed in the art is a mechanism or method that determines whether functionality may be lost between a docking station and a notebook, and notifying the computer user of that inadequacy.

BRIEF SUMMARY OF THE INVENTION

The problems noted above are solved in large part by a notebook computer and a docking station that have the capability of communicating with each other and determining their combined compatibilities prior to complete electrical coupling. More particularly, the preferred embodiments have the capability of reading device information and read only memory (ROM) dates to determine the compatibility between the notebook and the docking station, and vice versa.

In docking a notebook to a docking station in the preferred embodiments, first the notebook is physically coupled to the docking station. Prior to electrically coupling an expansion bus of the notebook to a bridge device in the docking station, a serial communication pathway is established, preferably by closing a set of electrical quick switches. The serial communication pathway is preferably an $I^2C$ bus, or some other suitable serial communication protocol. The notebook computer preferably communicates over the serial communication bus to a serial electrical programmable read only memory (EPROM) device residing in the docking station. This serial EPROM in the docking station preferably contains at least a series of bits or bytes that identify the particular docking station product, and also a series of bits or bytes that identify a date of the ROM of that device, which is indicative of the software release date for that device.

Likewise, a microcontroller of the docking station preferably communicates over the serial communication pathway to query the ROM of the notebook computer. The microcontroller of the docking station determines the particular product to which it is docked and a ROM date for that product. Each of the notebook computer and docking station then makes a determination as to the compatibility with the other.

In particular, the notebook computer compares the product identification code and the ROM date for the docking station to a series of entries contained in a table, preferably stored in the notebook's ROM. If a comparison of the product code to the table indicates that the devices are not compatible, then the notebook will not further electrically couple to the docking station. If the notebook determines that the devices are compatible, a second determination is made regarding whether the ROM date for the docking station meets a minimum requirement. If so, the notebook software approves the electrical connection between the notebook and the docking station.

In similar fashion, a microcontroller in the docking station compares the product code of the notebook to a table to determine whether the devices are compatible. If the product determination step is satisfied, the microcontroller then compares the ROM date of the notebook computer to determine if there is at least minimum functionality between the two devices. If so, software executed in the docking station microcontroller approves the electrical connection between the notebook and the docking station.

In the situation where the ROM date indicates that the devices are at least minimally compatible, the devices are allowed to electrically couple and docking operations continue as normal. However, in this case the preferred embodiment also notifies the computer system user that an update may be available for either the notebook ROM or the docking station ROM such that complete functionality may be obtained in the docked circumstance.

BRIEF DESCRIPTION OF THE DRAWINGS

For a detailed description of the preferred embodiments of the invention, reference will now be made to the accompanying drawings in which:

FIG. 4 shows a flow diagram of a docking sequence as exercised by the docking station.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The terms portable computer, notebook, and laptop refer generally to any computer or computer system that is portable and that may also dock with some form of docking station. Although the term notebook is used throughout this specification, it must be understood that term could be used interchangeably with the terms laptop and portable computer. Further, the term docking station is used throughout the specification, but some computer manufacturers may refer to that device as an expansion base or some other related terminology. Use of the term docking station should not be construed as a limitation as to breadth of the disclosure or claims.

DETAILED DESCRIPTION OF THE PREFERRED EMBODIMENTS

Figure 1:
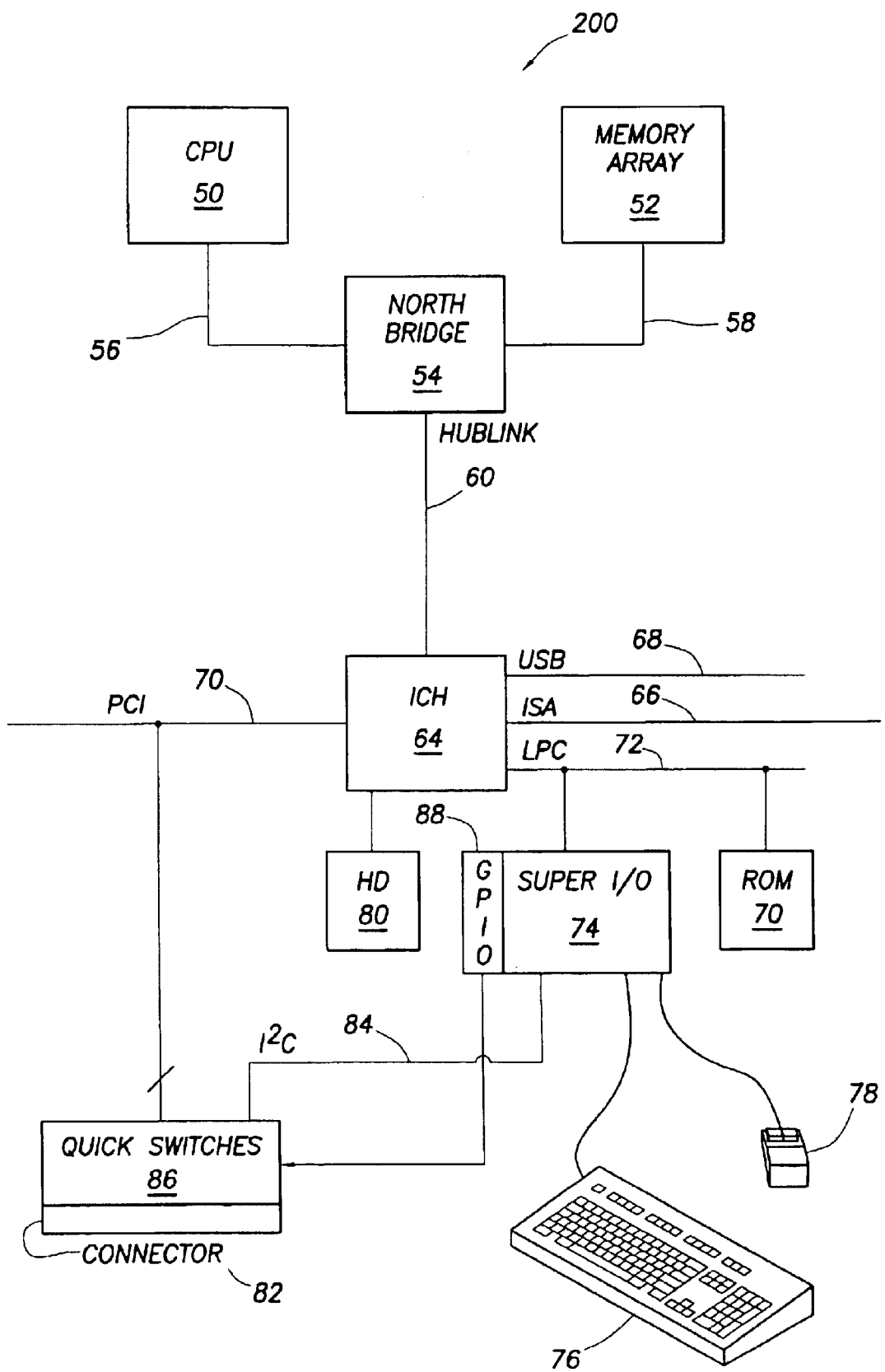
FIG. 1 shows an embodiment of a notebook computer of the present invention.

Referring now to FIG. 1, notebook computer system 200, in accordance with the preferred embodiment comprises a microprocessor or CPU 50 coupled to a main memory array 52 through an integrated bridge logic device 54. As depicted in FIG. 1, the bridge logic device 54 is sometimes referred to as a "North bridge," based generally upon its location within the computer system drawing. The CPU 50 preferably couples to the bridge logic 54 via a CPU bus 56, or the bridge logic 54 may be integrated into the CPU 50. The CPU 50 preferably comprises a Pentium III® microprocessor manufactured by Intel®. It should be understood, however, that other alternative types and brands of microprocessors could be employed. The main memory array 52 preferably couples to the bridge logic unit 54 through a memory bus 58, and the bridge logic 54 preferably includes a memory control unit (not shown) that controls transactions to the main memory by asserting the necessary control signals during memory accesses. The main memory array 52 may comprise any suitable type of memory such as dynamic random access memory (DRAM), any of the various types of DRAM devices, or memory devices that may become available in the future.

The North bridge 54 bridges various buses so that data may flow from bus to bus, even though these buses may have varying protocols. In the computer system of FIG. 1, the North bridge 54 couples to the primary expansion bus 60, which in the preferred embodiment is a Hublink communication bus, a proprietary system of Intel Corporation.

The preferred embodiment of notebook 200 further includes a second bridge logic device, known in the art as Input/Output Controller Hub (ICH) 64. The ICH 64 couples or bridges the primary expansion bus 60 to other secondary expansion buses. These other secondary expansion buses may include industry standard architecture (ISA) bus 66, a sub-ISA bus (not shown), a universal serial bus 68, a peripheral components interconnect bus 70, a low pin count (LPC) bus 72, and/or any of a variety of other buses that are available or may become available in the future. In the embodiment shown in FIG. 1, the ICH 64 bridges basic input/output system (BIOS) read-only memory (ROM) (also known as a firmware hub) to the primary expansion bus 60, therefore programs contained in the BIOS ROM 70 are accessible to the CPU 50. Also attached to the LPC bus 72 is a Super Input/Output (Super I/O) controller 74, which controls many system functions, including interfacing with various input and output devices such as keyboard 76 and mouse 78. The Super I/O 74 is often referred to as "Super" because of the many I/O functions it may perform.

The BIOS ROM 70 preferably contains firmware embedded on ROM memory chip and performs a number of low-level functions. For example, the BIOS executes the power on self-test (POST) during system initialization (Boot-Up). The POST routines test various sub-systems in the computer system, isolate faults and report problems to the user. The BIOS is also responsible for loading the operating system into the computer's main system memory. Further, the BIOS handles low-level input/output transactions to the various peripheral devices such as the hard drive 80 coupled to the ICH 64.

Because the preferred embodiments of the present invention relate to notebook computer systems, the notebook preferably includes a docking connector 82 coupled to the bus pins of a secondary expansion bus, in the preferred embodiments the PCI bus 70. It is through this docking connector 82 and across the PCI bus 70 that the notebook computer communicates with devices in the docking station.

Figure 2:
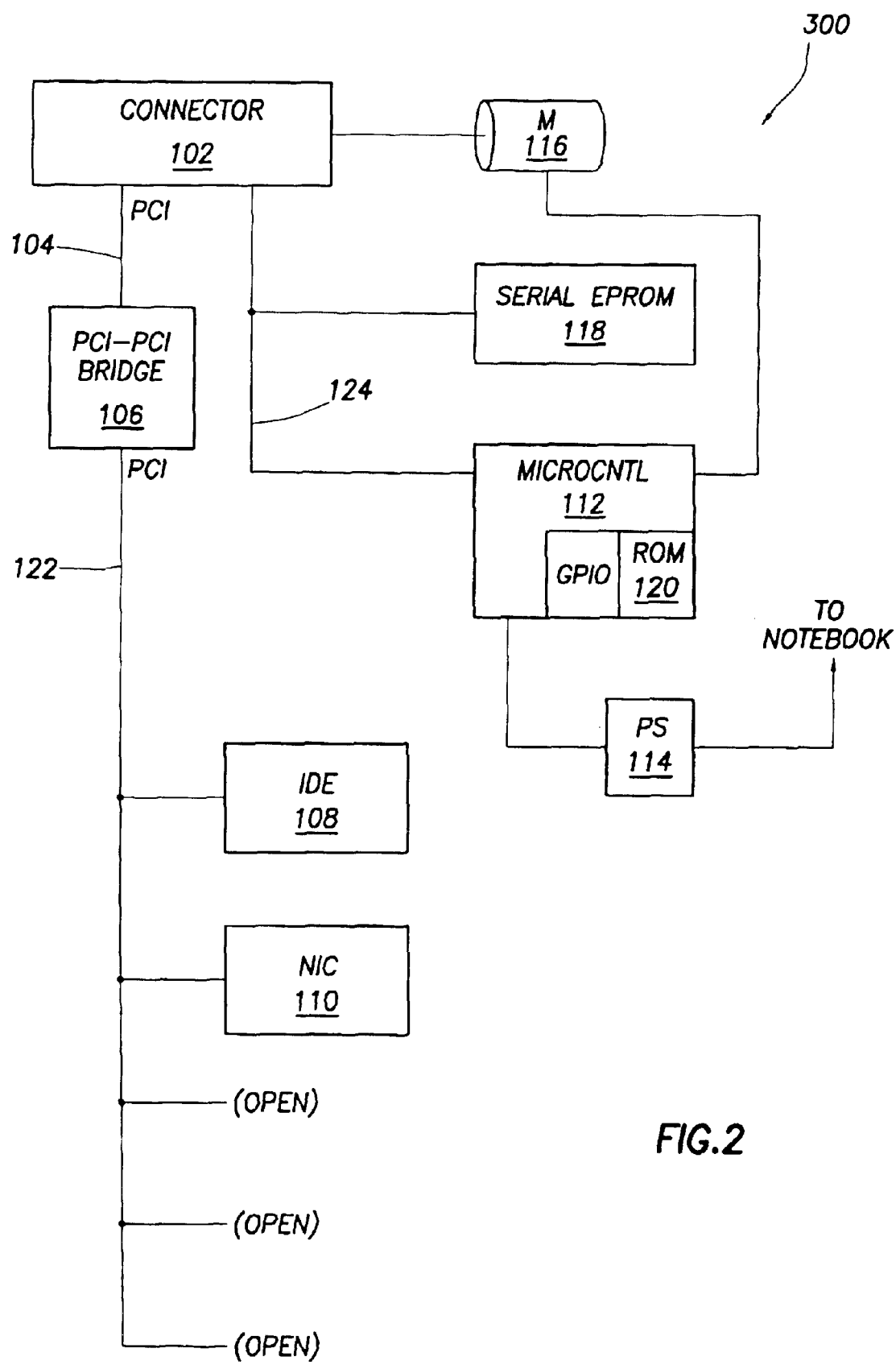
FIG. 2 shows an embodiment of a docking station of the present invention.

Referring now to FIG. 2, there is shown a partial electrical schematic of a docking station in accordance with the preferred embodiments. In particular, FIG. 2 shows a docking connector 102 which mates physically with the docking connector 82 of the notebook computer, and is the pathway through which the electrical signals between the notebook 200 and the docking station 300 flow. The pins (not shown) of docking connector 102 preferably couple to the bus traces (not shown) of a PCI bus 104, which preferably couple to a PCI—PCI bridge 106. The PCI—PCI bridge 106 bridges the PCI bus 70 of the notebook computer to the PCI bus 122 within the docking station 300. This bridge allows for connecting a greater number of PCI devices in the docking station 300 than the physical or protocol based restraints than a mere PCI bus extension would allow. The schematic of FIG. 2 shows a total of five available PCI slots on the downstream side of the PCI—PCI bridge 106. Two of those slots are shown to be filled with an IDE device 108 and a network interface card (NIC) 110 respectively. The remaining slots are open, but may be filled with any suitable device, such as a modem card. One skilled in the art will realize that multiple PCI devices may be attached to the PCI bus 60, yet for clarity of the figure, only two are shown.

The docking station of the preferred embodiment further comprises a microcontroller 112 coupled to the I$^2$C bus 124. The microcontroller 112 controls an array of functions in the docking station, including controlling the flow of power from power supply 114 to the notebook computer, and further may control a docking motor 116 in the docking station. The microcontroller 112 is preferably a NEC device part number PD780034Y.

Referring again to FIG. 1, the Super I/O controller 74 includes an Inter-Integrated Circuit (I$^2$C) serial bus 84 port. The I$^2$C bus is a dual line, multidrop serial bus developed by Philips Semiconductors that comprises a clock line and one data line. The devices connected to the I$^2$C bus can act as either master or slave devices, and each device is software addressable by a unique address. Master devices can operate as transmitters, receivers, or combination transmitter/receivers to initiate 8-bit data transfers between devices on the bus. The I$^2$C utilizes collision detection and arbitration to prevent data corruption if two or more masters simultaneously transfer data. Details regarding the I$^2$C bus may be found in "The I$^2$C-Bus Specification," Version 2.1 (January 2000), authored by Philips Semiconductors®. The I$^2$C serial bus 84 preferably couples to the docking station connector 82. The electrical conductors of the I$^2$C serial bus 84, as well as the electrical conductors of the PCI bus 70, preferably coupled to the docking station connector 82 pins (not shown) in such a way as to be selectively coupled and de-coupled from those pins. More particularly, and still referring to FIG. 1, the preferred embodiment comprises a plurality of quick switch devices 86 that allow each of the bus signals of the PCI bus 70, and each of the serial signals of the I$^2$C serial bus 84, to be selectively coupled to the physical pins (not shown) of the connector 82. An example of a device capable of performing this quick switch service is a field effect transistor (FET) quick switch manufactured by Texas Instruments Inc., device number TI SN74CBT53306. That plurality of quick switches 86 is preferably controlled by a plurality of output signals from the general purpose input/output (GPIO) 88, available on the Super I/O 74. Use of the GPIO 88 on the Super I/O 74, however, is merely exemplary. One of ordinary skill in the art could fashion many ways to control the quick switches 86 through the use of other output signals available within the notebook computer 200.

In the docking operation, the notebook computer 200 and the docking station 300 are physically coupled such that the notebook docking connector 82 mates with the docking station docking connector 102. If provided, motor 116 of the docking station may physically pull the notebook computer 200 into mating relationship. It is assumed for purposes of the following explanation that the notebook computer 200 is turned on and is operational—a "hot dock." The description does not change significantly if the notebook computer is powered off, except that the notebook 200 must complete its typical boot process before performing a docking sequence.

Once physically connected, the Super I/O 74 preferably, through the use of the GPIO 88, activates the quick switches 86 associated with the I$^2$C bus. One of ordinary skill in the art could fashion many ways to detect the physical docking of the notebook and docking station, including a microswitch or the completion of an electrical circuit based on connecting pins of the docking connectors. Referring to the combination of the FIGS. 1 and 2, this activation couples the I$^2$C bus 84 in the notebook computer to the I$^2$C bus 124 in the docking station 300. In this manner, the notebook computer 200 preferably communicates with a serial EPROM 118. In like fashion, the microcontroller 12 is capable of communicating with the notebook computer ROM 70 over this I$^2$C bus 84/124.

The notebook computer preferably reads information from the docking station serial EPROM 118 (preferably a part number 24C02), and the docking station microcontroller 112 preferably reads the information from the ROM 70 of the notebook computer. Each of these sets of reads preferably comprises at least the read of a product code that uniquely identifies each of the notebook and docking station, and also comprises the reading of a ROM date associated with each of these devices. This ROM date directly or indirectly reflects its respective software revision.

Figure 3:
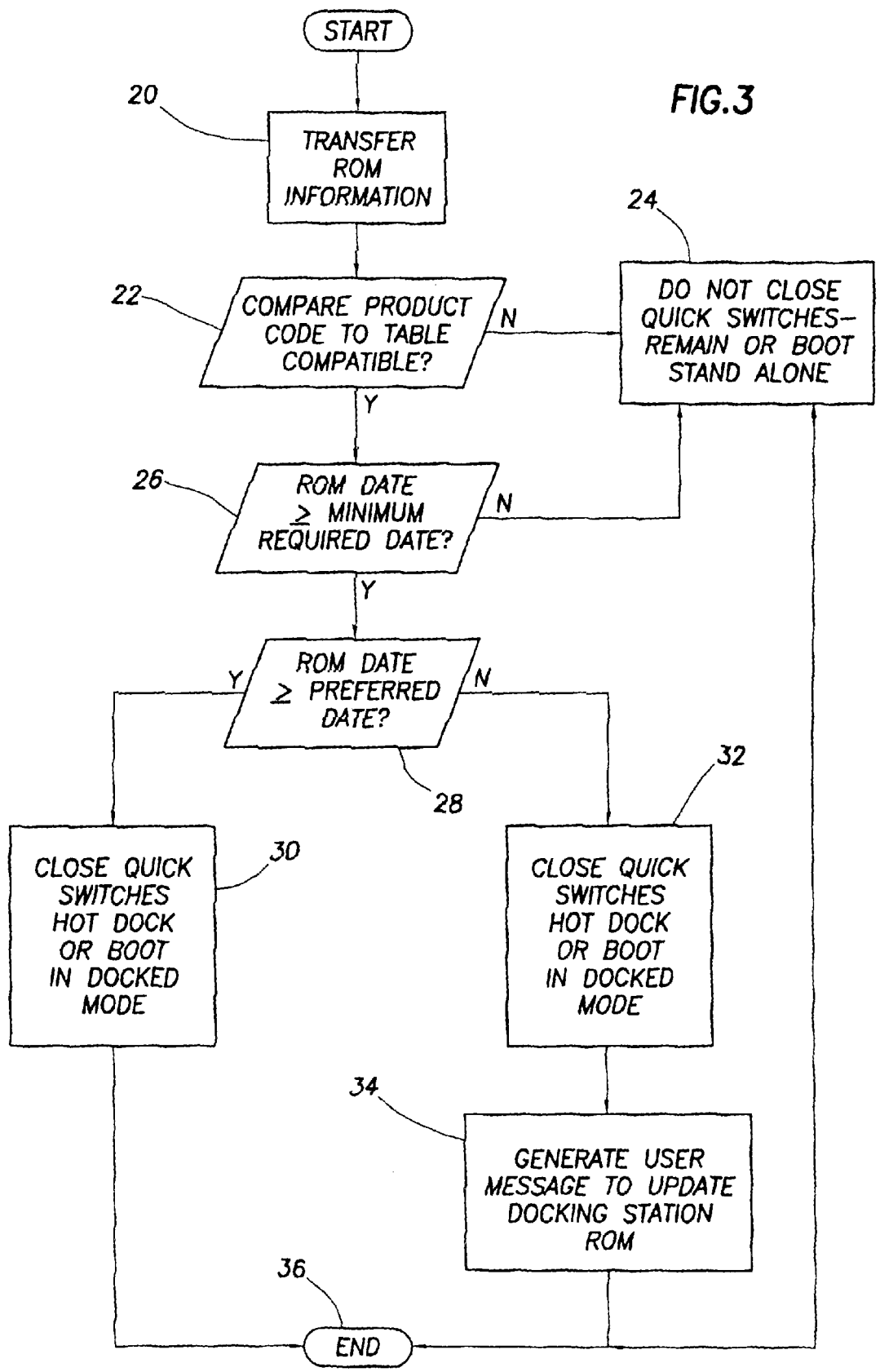
FIG. 3 shows a flow diagram for a docking sequence as exercised by the notebook computer.

Referring now to FIG. 3, once the product code and ROM date are transferred via the I$^2$C bus 84 to the notebook computer 200 (block 20), software executed in the notebook computer 200 makes an initial determination as to whether the notebook is compatible with the docking station based on the information that represent a products code of the docking station (block 22). Preferably, the software is executed in the Super I/O 74 (also known as a keyboard controller), but the software could likewise execute in the CPU 50 or any other CPU or micro-controller of the system. If the two devices are incompatible, the decision process ends and the quick switches 80 for the PCI bus are not closed (blocks 24 and 36). Thus, the notebook computer operates stand alone (not docked to the docking station) or boots up in a stand-alone mode. If, however, the docking station and the notebook computer are compatible, the notebook software next determines whether the ROM date is sufficiently new to enable at least minimum functionality between the notebook 200 and the docking station 300 (block 26). Thus, and still referring to FIG. 3, the ROM date is compared to the minimum date in the table stored in the ROM 70 associated with that particular product code. If the ROM date is equal to or later than the minimum required date, then as far as the notebook computer is concerned, the quick switches 86 may be closed. If the ROM date is later than the preferred date stored in the table (indicating maximum functionality between the notebook 200 and docking station 300), no further action is taken (apart from electrically coupling the buses via the quick switches 86) (block 30). If, however, the ROM date of the docking station 300 lies between the minimum date and the preferred date (blocks 26 and 28), the software preferably closes the quick switches (block 32) and takes the additional step of notifying the user that while at least minimum functionality between the notebook and the docking station may take place, there needs to be an update to the ROM of the docking station completed (block 34). This update could be by inserting a new ROM device, or it could be connecting to an appropriate internet site, downloading the new software for the docking station, and installing that new software using utilities known to those of ordinary skill in the art.

The discussion to this point has centered on the most likely occurrence of a newer model notebook docking with an older model docking station. However, some computer manufacturers make docking station devices that are backwardly compatible. Thus, a newer model docking station may be capable of satisfactorily docking with an older model notebook computer. In the preferred embodiments, the docking station 300 also has the capability of determining whether the notebook to which docking is proposed can or should be done. FIG. 4 shows a flow diagram of software routines preferably executed by the docking station 300 microcontroller 112 to determine whether docking should complete.

After receiving from the notebook computer's ROM 70 a product code identifying the type of notebook computer and a ROM date (block 140) (the same type information transferred from the docking station to the notebook), preferably the microcontroller 112 compares the product code received to a table stored in its on-board ROM 120 (block 142). If the product code of the notebook 200 exists in the table of the microcontroller ROM 120 (or in some other way indicates that the two devices may be compatible) (block 142), software executed by the microcontroller preferably compares the ROM date of the notebook computer to the corresponding table entry (blocks 148 and 150). If the microcontroller determines the ROM date meets at least a minimum required date (block 148), then as far as the docking station is concerned, the quick switches 86 may be closed. If the ROM date of the notebook 200 meets or is later than the preferred date in the table stored in the microcontroller 112 ROM 120 (block 150), the docking station allows closing of the quick switches 86 (block 152), but no action is taken to notify the user. However, if that ROM date falls between the minimum required date and the preferred date, the microcontroller preferably allows quick switch closing (block 154) and communicates with the notebook 200 over the I²C bus 84 (block 156) to inform the user. Through any one of several mechanisms familiar to one of ordinary skill in the art, this communication over the I²C bus 84 precipitates a message to the computer system user that indicates what action may be taken (such as updating the ROM in the notebook 200) to enable full functionality between the notebook 200 and the docking station 300.

The decision whether to enable the quick switches 86, and thus electrically couple the buses of the notebook and docking station, is preferably made by both the notebook 200 and the docking station 300. That is, in the preferred embodiment, the notebook computer alone is not responsible for deciding whether to close the quick switches 86. If one could be assured that only newer model notebooks would be docked to older model docking stations, the notebook computer alone could make that determination. But because older model notebooks may be docked to newer model docking stations, the decision must include input from the docking station itself. Thus, if the docking station microcontroller 112 is satisfied that the products are compatible (that is, the notebook computer meets at least the minimum required ROM date), then the microcontroller preferably communicates with the Super I/O controller 74 via the I²C bus 84. This communication could take many forms, and this invention is not limited to any one of those forms. Thus, the Super I/O controller considers its own decision (based on the comparison of the product codes and ROM dates of the docking station), and the decision or vote cast by the microcontroller 112 (based on the product codes and ROM dates of the notebook) to determine whether or not to close the quick switches on the PCI bus 70/104. If it is determined that both devices are satisfied that docking can take place, the GPIO 88 outputs of the Super I/O 74 activate the remaining quick switches 86. The activation of these quick switches merely electrically couples the two PCI buses. There may be, and preferably is, some handshaking between the docking station PCI—PCI bridge 106 and the ICH 64. However, one of ordinary skill in the art is well aware of these handshaking protocols.

The above discussion is meant to be illustrative or the principles and various embodiments of the present invention. Numerous variations and modifications will become apparent to those skilled in the art once the above disclosure is fully appreciated. For example, now understanding why and when to notify a user that updates may be required, one of ordinary skill could easily devise a system where the user is prompted only once (e.g., by setting a bit in the system that indicates the user has already been notified), or where the user is prompted periodically (e.g., once a week). Further in the situation where multiple notebook computers dock to a single docking station, also known as "hoteling," one of ordinary skill could easily devise a system that keeps track of which of the multiple notebook computers has been docked, and which ones required updates. It is intended that the following claims be interpreted to embrace all such variations and modifications.

What is claimed is:

1. A computer system, comprising:
   a notebook computer having an expansion bus;
   a docking station having an expansion bus; and
   a communication pathway coupling the notebook computer and the docking station;
   wherein the notebook computer determines whether the notebook computer expansion bus should be coupled to the docking station expansion bus by communicating across the communication pathway, and wherein the docking station determines whether the docking station expansion bus should be coupled to the notebook computer expansion bus by communication across the communication pathway.

2. The computer system as defined in claim 1 wherein said communication pathway further comprises a serial communication pathway.

3. The computer system as defined in claim 2 wherein the serial communication pathway further comprises an inter-integrated Circuit (I²C) bus.

4. The computer system as described in claim 1 wherein the notebook computer further comprises:
   a micro processor;
   a system main memory;
   a first bridge logic device coupling said microprocessor and system main memory;
   a second bridge logic device coupled to the first bridge logic device by way of a primary expansion bus;
   a notebook docking connector coupled to the second bridge logic device by way of the expansion bus of the notebook computer, the expansion bus being a secondary expansion bus;

an input/output device coupled to the second bridge logic device by way of a secondary expansion bus, and wherein said input/output device is configured to communicate across the communication pathway to determine whether the notebook computer expansion bus should be coupled to the docking station expansion bus, and wherein said communication pathway is a notebook computer serial bus coupled between the docking connector and the input/output device.

5. The computer system as defined in claim 4 wherein the notebook computer serial bus further comprises an inter-integrated Circuit ($I^2C$) bus.

6. computer system as defined in claim 4 wherein said docking station further comprises:

a docking station docking connector;

a bus bridge coupled to the docking station docking connector, wherein said bus bridge bridges the secondary expansion bus of the notebook computer to an expansion bus of the docking station;

a docking station serial bus coupled to the docking station docking connector;

a microcontroller coupled to the docking station serial bus, and wherein said microcontroller is configured to communicate across the communication pathway to determine whether the docking station expansion bus should be coupled to the notebook computer expansion bus.

7. The computer system as defined in claim 6 wherein the serial communication pathway further comprises an inter-integrated Circuit ($I^2C$) bus.

8. The computer system as defined in claim 6 further comprising:

a read only memory device (ROM) coupled so the second bridge logic device of said notebook computer;

a serial electrically programmable read only memory device (EPROM) coupled to the docking station serial bus;

wherein the input/output device of said notebook computer is further adapted to read information from the serial EPROM across the docking station serial bus as part of determining whether the docking station is compatible with the notebook computer; and wherein the microcontroller of the docking station is further adapted to read information from said notebook computer ROM across the notebook computer serial bus as part of determining whether the docking station expansion bus should be coupled to the notebook computer expansion bus.

9. The computer system as defined in claim 4 wherein the notebook computer comprise.

said notebook computer serial bus having a plurality of conductors;

said secondary expansion bus having a plurality of conductors;

a plurality of electrically controlled switches coupled one each between the docking connector and each of the plurality of conductors of the serial bus and the secondary expansion bus; and said input/output device having a plurality of digital output signals coupled to the plurality of electrically controlled switches, said output signals configured to selectively activate the plurality of electrically controlled switches.

10. The computer system as defined in claim 9 wherein the input/output device is configured to activate the digital output signals coupled to the electrically controlled switches of the serial bus to allow the notebook computer and the docking station to communicate when determining whether the notebook computer and the docking station are compatible.

11. The computer system as defined in claim 9 wherein the input/output device is configured to activate the digital output signals coupled to the electrically controlled switches of the secondary expansion bus after a determination by both the notebook computer and the docking station that their respective expansion buses should be coupled together.

12. A method of docking a notebook computer to a docking station, the method comprising:

coupling the notebook computer to the docking station;

transferring information about software executable on the docking station to the notebook computer;

transferring information about software executable on the notebook computer to the docking station;

determining by the notebook computer whether the notebook computer and the docking station are sufficiently compatible to couple their expansion buses based on the information, and determining by the docking station whether the notebook computer and the docking station are sufficiently compatible to couple their expansion buses based on the information; and if both the notebook computer and the docking station agree to at least partial compatibility, electrically coupling a secondary expansion bus of the notebook computer to a bus bridge in the docking station.

13. A method of docking a notebook computer to a docking station, the method comprising;

coupling the notebook computer to the docking station;

transferring information about software executable on the docking station to the notebook computer by establishing a serial communication pathway between the notebook computer and the docking station; and transferring a read only memory (ROM) date of the docking station across the serial communication pathway to the notebook computer;

transferring information about software executable on the notebook computer to the docking station by transferring a ROM date of the notebook computer across the serial communication pathway to the docking station;

determining whether the notebook computer and the docking station are compatible based on the information; and if both the notebook computer and the docking station agree to at least partial compatibility electrically coupling a secondary expansion bus of the notebook computer to a bus bridge in the docking station.

14. The method as defined in claim 13 wherein establishing the serial communication pathway further comprises closing a plurality of electrically controlled switches coupling the serial communication pathway between the notebook computer and the docking station.

15. The method as defined in claim 13 wherein transferring information across the serial communication pathway further comprises transferring information across an inter-integrated Circuit ($I^2C$) bus.

16. A method of docking a notebook computer to a docking station, the method comprising:
- coupling the notebook computer to the docking station;
- transferring information about software executable on the docking station to the notebook computer;
- transferring information about software executable on the notebook computer to the docking station;
- determining whether the notebook computer and the docking station are compatible based on the information by
  - executing a program in the notebook computer which program determines whether the ROM date of the docking station is compatible with the notebook computer;
  - executing a program in the docking station which determines whether ROM date of the notebook computer is compatible with the docking station; and
  - communicating a message by said docking station to said notebook computer, the message being one of approval and disapproval of electrically coupling the secondary expansion bus of the notebook computer to the bus bridge in the docking station;
- electrically coupling a secondary expansion bus of the notebook computer to a bus bridge in the docking station if both the notebook computer and the docking station agree to at least partial compatibility.

17. The method as defined in claim 16 wherein executing the program in the notebook computer further comprises comparing the ROM date of the docking station to a table containing information about a plurality of docking stations.

18. The method as defined in claim 16 wherein executing the program in the docking station further comprises comparing the ROM date of the notebook computer to a table containing information about a plurality of notebook computers.

19. The method as defined in claim 12, wherein the determining step further comprises:
- determining whether software in said docking station enables maximum functionality with the notebook computer; and if not,
- notifying a computer system user of a need to upgrade the docking station software.

20. The method as defined in claim 12, wherein the determining step further comprises:
- determining whether software in the notebook computer enables maximum functionality with the docking station; and if not,
- notifying a computer system user of a need the upgrade the notebook computer software.

21. The method as defined in claim 20, wherein the determining step further comprises:
- determining whether software in said docking station enables maximum functionality with the notebook computer; and if not,
- notifying a computer system user of a need to upgrade the docking station software.

22. The method as defined in claim 21, wherein notifying the computer system user further comprises sending a message across a serial communication pathway to notify the computer system user.

23. The method as defined in claim 12 wherein electrically coupling the secondary expansion bus of the notebook computer to the bus bridge in the docking station further comprises closing a plurality of electrically controlled switches coupling the secondary expansion bus of the notebook to the bus bridge of the docking station.

24. A docking station operable to dock to a notebook computer, the docking station comprising:
- a docking station docking connector;
- a bus bridge coupled to the docking station docking connector, wherein said bus bridge bridges a secondary expansion bus of the notebook computer to an expansion bus of the docking station;
- a docking station serial bus coupled to the docking station docking connector; and
- a microcontroller coupled to the docking station serial bus, said microcontroller configured to determine the compatibility of the notebook computer by reading at least read only memory (ROM) date or a product code of the notebook over the docking station serial bus.

25. The docking station as defined in claim 24, wherein the microcontroller is further configured to communicate a vote to the notebook computer regarding whether to couple the secondary expansion bus of the notebook computer to the expansion bus of the docking station.

26. A method of operating a notebook computer being docked to a docking station, the method comprising:
- coupling a serial bus to the docking station;
- transferring information about the docking station across the serial bus to the notebook computer;
- receiving a vote from the docking station being a vote to couple a secondary expansion bus of the notebook computer to the docking station or a vote not to couple the secondary expansion bus of the notebook computer to the docking station;
- determining the compatibility of the notebook computer based on the transferred information; and if the notebook computer is compatible with the docking station and the docking station votes to couple,
- coupling the secondary expansion bus of the notebook computer to the docking station.

27. The method as defined in claim 26 wherein coupling the serial bus to the docking station further comprises:
- coupling the serial bus of the notebook computer to a plurality of electrically controlled switches, which switches selectively couple the serial bus of the notebook to a serial bus of the docking station;
- activating the plurality of electrically controlled switches; by
- asserting an output signal of a device within the notebook computer.

28. The method as defined in claim 27 wherein asserting an output signal of a device within the notebook computer further comprises asserting a general purpose digital output signal of a Super Input/Output controller.

29. The method as defined in claim 26 wherein coupling the secondary expansion bus of the notebook computer to the docking station further comprises:
- coupling bus conductors of the secondary expansion bus to a plurality of electrically controlled switches, which switches selectively couple the secondary expansion bus to the docking station;
- activating the plurality of electrically controlled switches; by
- asserting an output signal of a device within the notebook computer.

30. The method as defined in claim 29 wherein asserting an output signal of a device within the notebook computer further comprises asserting a general purpose digital output signal of a Super Input/Output controller.

31. The method as defined in claim 26 further comprising generating a message for a computer system user if said docking station requires a software update.

32. A method of operating a docking station for docking with a notebook computer, the method comprising:
- transferring information about the notebook computer across a communication pathway;
- determining by the docking station the compatibility of the docking station with the notebook computer based on the information; and, based on that determination,
- sending a message from the docking station to the notebook computer indicating one of the docking station's approval or disapproval of further electrically coupling the docking station to the notebook computer.

33. The method as defined in claim 32 further comprising sending a message across the communication pathway which invokes a message to the notebook computer user indicating the need to upgrade software of the notebook computer.

34. The method as defined in claim 33 wherein sending the message across the communication pathway further comprises sending the message across an inter-integrated Circuit ($I^2C$) bus.

* * * * *